United States Patent [19]
Schultz et al.

[11] Patent Number: 4,720,118
[45] Date of Patent: Jan. 19, 1988

[54] ANTI-JACKKNIFING APPARATUS FOR A SEMITRAILER RIG

[76] Inventors: Rainer M. Schultz, Lagerlöfstr. 19, 2000 Hamburg 65; Denis B. Browne, Fuhlsbüttlerstr. 611, 2000 Hamburg, both of Fed. Rep. of Germany

[21] Appl. No.: 18,697
[22] Filed: Feb. 25, 1987

[30] Foreign Application Priority Data

Feb. 26, 1986 [DE] Fed. Rep. of Germany ....... 3606120

[51] Int. Cl.$^4$ ............................................. B62D 53/08
[52] U.S. Cl. ..................................... 280/432; 280/426
[58] Field of Search ................................ 280/432, 426

[56] References Cited

U.S. PATENT DOCUMENTS

| | | | |
|---|---|---|---|
| 3,250,547 | 5/1966 | Myers | 280/432 |
| 3,722,918 | 3/1973 | Conner | 280/432 |
| 4,015,859 | 4/1977 | Hegel et al. | 280/432 |
| 4,109,929 | 8/1978 | Koroknay et al. | 280/432 |
| 4,204,700 | 5/1980 | Haines, Sr. | 280/432 |
| 4,313,616 | 2/1982 | Howard | 280/432 |
| 4,438,943 | 3/1984 | Hebert | 280/432 |

FOREIGN PATENT DOCUMENTS 3004409  8/1981  Fed. Rep. of Germany .

Primary Examiner—David M. Mitchell
Assistant Examiner—Donn McGiehan
Attorney, Agent, or Firm—Kenyon & Kenyon

[57] ABSTRACT

In an anti-jackknifing apparatus for a semitrailer rig, upon coupling of a semitrailer to a tractor by insertion of a king pin and a wedge on the trailer into a fifth wheel of the tractor, a pin connected to the wedge traverses a guideway to execute therealong a movement limited and attenuated by double-action hydraulic cylinders connected to hydraulic valve group in turn electrically tied to a control unit. At the guideway, limit switches are provided for setting for each direction of angular motion a predetermined maximum jackknifing angle dependent on vehicle construction. The attenuation of rotary movement between the tractor and the semitrailer is implemented by throttle valves as a function of vehicle speed as measured by a speedometer and as a function of brake pressure as measured by two pressure switches.

15 Claims, 5 Drawing Figures

ANTI-JACKKNIFING APPARATUS FOR A SEMITRAILER RIG

BACKGROUND OF THE INVENTION

This invention relates to an anti-jackknifing apparatus for a semitrailer rig.

Such an anti-jackknifing apparatus is known from U.S. Pat. No. 4,109,929. As disclosed in that patent, a wedge on a trailer is inserted into a fifth wheel on a tractor and is extended rearwardly, whereby the wedge can cooperate with a brake disk disposed on the trailer and circularly surrounding the fifth wheel. Upon a braking of the tractor during linear or straight forward motion, a rear part of the wedge is simultaneously pressed against the brake disk, thereby preventing a shearing out of the trailer relative to the tractor. When the semitrailer rig is traveling through a curve, the pressure of the wedge against the brake disk is weaker. The wedge and brake disk assembly, therefore, operates independently of the speed of the semitrailer rig. Moreover, when the rig is maneuvered at lower speeds, there exists an undesirable braking of the trailer.

Further devices are known, which effectuate an attenuation of the rotary movement between the tractor and the trailer (attenuation of the jackknifing angle) either as a function of the speed of travel only or as a function of the brake pressure only.

Thus, as disclosed in German Offenlegungsschrift No. 30 04 409, an anti-jackknifing apparatus comprises two pairs of single-action hydraulic cylinders cooperating with a hydraulic valve group and a control unit to attenuate the angular movement between tractor and trailer more or less strongly as a function of the vehicle speed. In addition, U.S. Pat. No. 4,015,856 describes a stabilization device for controlling the swinging of a trailer where two single-action hydraulic cylinders bring about an attenuation of jackknifing angle in connection with a pin and a cable placed around the pin and connected with the tractor.

Lastly, from U.S. Pat. No. 3,250,547 a hydraulic control system for semitrailer rigs is known where unimpeded maneuvering of a semitrailer rig with unattenuated jackknifing of the trailer is made possible by opening a valve.

An object of the present invention to provide an improved anti-jackknifing apparatus of the above-mentioned kind.

SUMMARY OF THE INVENTION

The present invention is directed to an antijackknifing apparatus for a semitrailer rig including a trailer hitched to a tractor via a king pin and a wedge on the trailer and a fifth wheel on the tractor. The wedge is disposed behind the king pin and is inserted together with the king pin into the fifth wheel.

The anti-jackknifing apparatus comprises a coupling plate attached to the trailer and provided with an arcuate guide slot extending along a portion of a circle having a center. A guide pin attached to the wedge traverses the slot in the coupling plate and extends substantially perpendicularly with respect thereto. A pivot pin mounted above the king pin and coaxial therewith is disposed at the center of the arcuate slot. Two double-action hydraulic cylinders having respective piston rods with outer ends connected to the guide pin are provided for attenuating rotary motion between the tractor and the trailer. A pair of limit switches are attached to the coupling plate at points spaced from one another along the arcuate slot for generating signals upon the attainment of predetermined angles between the trailer and the tractor. The limit switches are operable by the guide pin during the motion thereof along the arcuate slot. A control unit is operatively connected to the limit switches and to a hydraulic circuit including the hydraulic cylinders. The control unit serves to control pressurization of the cylinders to attenuate rotary motion between the tractor and the trailer as a function of both speed of travel of the semitrailer rig and of brake pressure and further serves to limit the jackknifing angle between the trailer and the tractor in response to signals from the limit switches.

Pursuant to other features of the present invention, a lever connects the guide pin to the pivot pin and the hydraulic cylinders are articulatedly attached to a bracket in turn mounted to the trailer.

The control unit is operatively connected to the limit switches, to a speedometer and to a sensor on the tractor which measures brake pressure in the brake cylinders of the tractor.

Preferably, the hydraulic circuit which includes the hydraulic cylinders comprises valves operatively connected to the cylinders and electrically connected to the control unit for permitting, in response to signals from the control unit, free flow of a pressurization fluid between the cylinders for a first set of travel speed and brake pressure values and for reducing flow of the fluid between the cylinders for a second set of travel speed and brake pressure values. Advantageously, the anti-jackknifing apparatus includes, in the control unit, means for preventing a fluid flow reduction at travel speeds below a first predetermined threshold and at brake pressures below a second predetermined threshold.

In an apparatus according to the invention, every variation in attenuation of the relative movement between tractor and trailer can be implemented. Accordingly, the occurrence of abnormal or undesired conditions such as skidding or breakout of the trailer can be prevented effectively in the incipient state. Attenuation of the jackknifing angle, resulting from the action of the double-action hydraulic cylinders and made variable by the hydraulic valve arrangement with the aid of the control unit, and the prevention of jackknifing are effectuated as a function of the speed and brake pressure of the tractor. In addition, the maximum jackknifing angle, i.e., the greatest permissible angle between the longitudinal axes of the tractor and of the trailer, can be selected in a simple manner by the locations of the limit switches along the guideway or slot in the coupling plate, in accordance with the design of the semitrailer rig. When the maximum jackknifing angle is reached, the flow between the two hydraulic cylinders is blocked, owing to which this important jackknifing protection is independent of the brake pressure and the prevailing speed.

It is also possible, using the apparatus according to the invention, to carry out unimpeded maneuvering at low speeds, in that the limit switches are effective only at speeds above a predetermined value such as 15 km/h. At speeds below 15 km/h, the maximum permissible jackknifing angle is increased by the arc length of the arcuate guide slot, e.g., to 135° on each side, so that damage to the anti-jackknifing apparatus at relatively large maneuvering angles is avoided. Simple construction using commercial parts adds to the advantages of the device pursuant to the invention.

DETAILED DESCRIPTION

Figure 1:
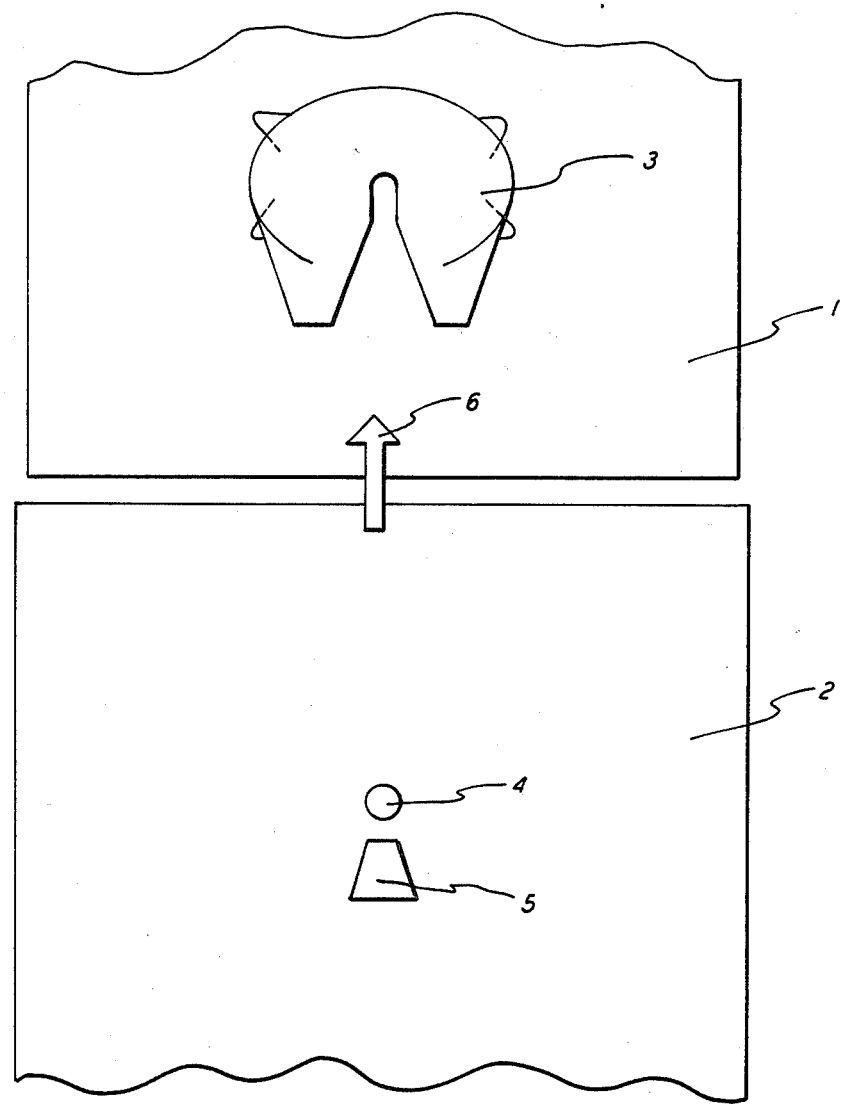
FIG. 1 is a schematic bottom view of a tractor and a trailer prior to a hitching of one to the other.

FIG. 1 shows the contours of a semitrailer rig including a tractor 1 and a trailer 2 before hitching of one to the other. During a hitching operation, first a king pin 4 and then a wedge 5, both provided on trailer 2, are inserted into an opening in a fifth wheel 3 located on tractor 1. An arrow 6 indicates the travel direction and the direction of coupling.

Figure 3:
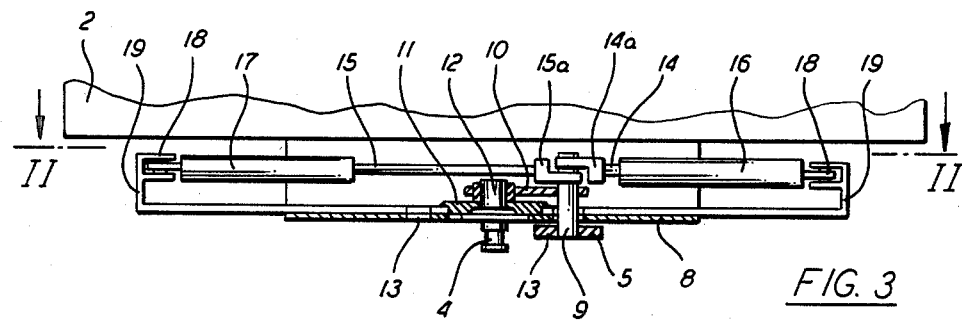
FIG. 3 is a cross-sectional view taken along line III—III in FIG. 2.
Figure 2:
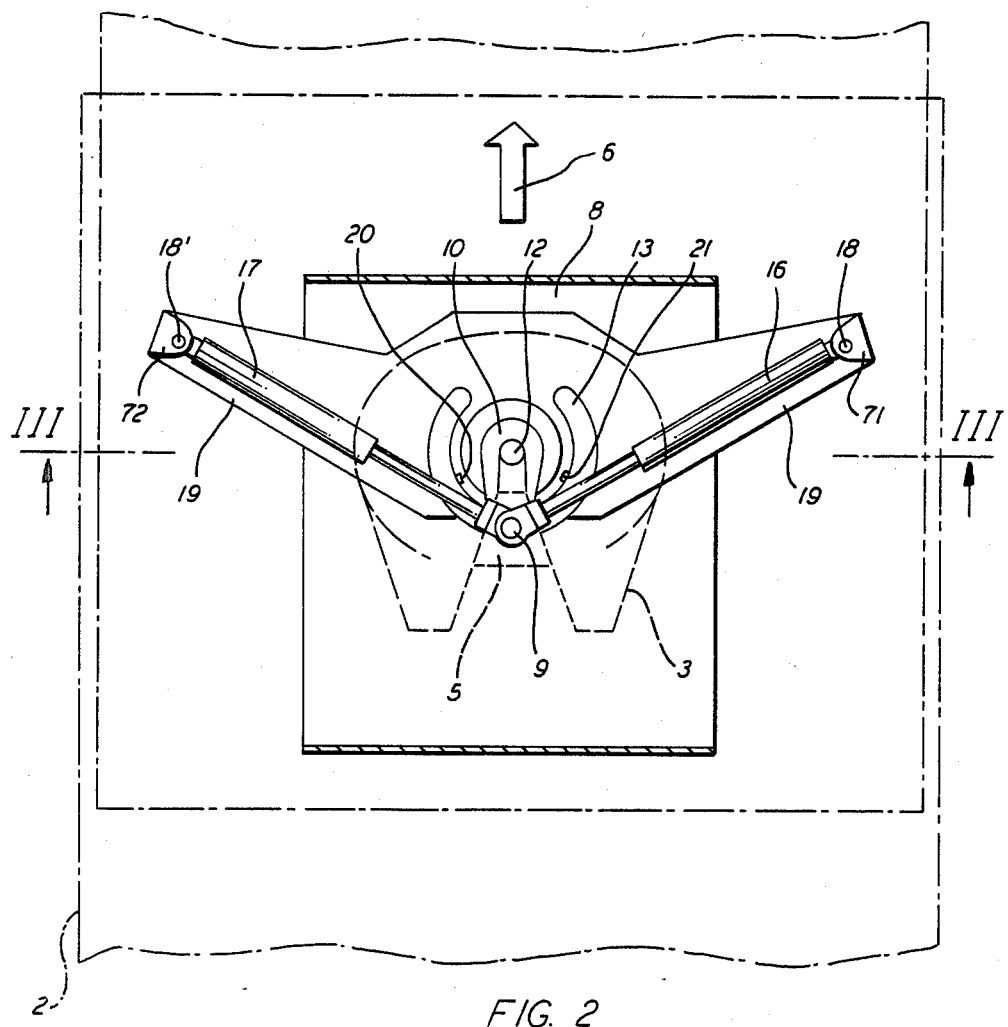
FIG. 2 is a partially schematic bottom view of the forward end of a trailer provided with an anti-jackknifing apparatus in accordance with the present invention, showing the configuration of a portion of the anti-jackknifing apparatus in an aligned state of a tractor and a trailer.

FIGS. 2 and 3 depict the coupling region of the semitrailer rig after hitching has been effected. In FIG. 2, structural parts disposed on trailer 2, which parts are viewed through a plane II—II in FIG. 3, are represented in solid or dashed lines, while fifth wheel 3 on tractor 1 is represented in dot-dash lines. For greater clarity wedge 5 is represented in FIG. 3 at the right, next to king pin 4.

Wedge 5 is attached under a coupling slide plate 8 to a vertical guide pin 9, which pin perpendicularly traverses an arcuate guide slot 13 in coupling slide plate 8 and is connected to a horizontal lever 10. This lever 10 and hence also pin 9 and wedge 5 are shown rotated by 90° in FIG. 3. Lever 10 is articulated to a pivot pin 12 disposed on a bearing flange 11 coaxial with king pin 4 at the center of arcuate slot 13. Due to the length of arcuate slot or guideway 13, guide pin 9 receives a maximum movement space in both directions.

Lugs 14a and 15a disposed at outer ends of piston rods 14 and 15 of hydraulic cylinders 16 and 17 are rotatably articulated to the upper end of pin 9. Hydraulic cylinders 16 and 17 are rotatably attached at pivot points 18 and 18' to respective flanges 71 and 72 of a bracket 19.

On coupling slide plate 8, limit switches 20 and 21 are provided at a predeterminable pivot or jackknifing angles along slot 13. Upon engagement of a switch 20 or 21 by guide pin 9 during motion thereof along slot 13, the engaged switch generates an output signal having an effect described below with reference to FIG. 5. The pivot angle limited or defined by limit switches 20 and 21 is the jackknifing angle $\beta$ maximally permissible on both sides of semitrailer 2 relative to the tractor 1.

Figure 4:
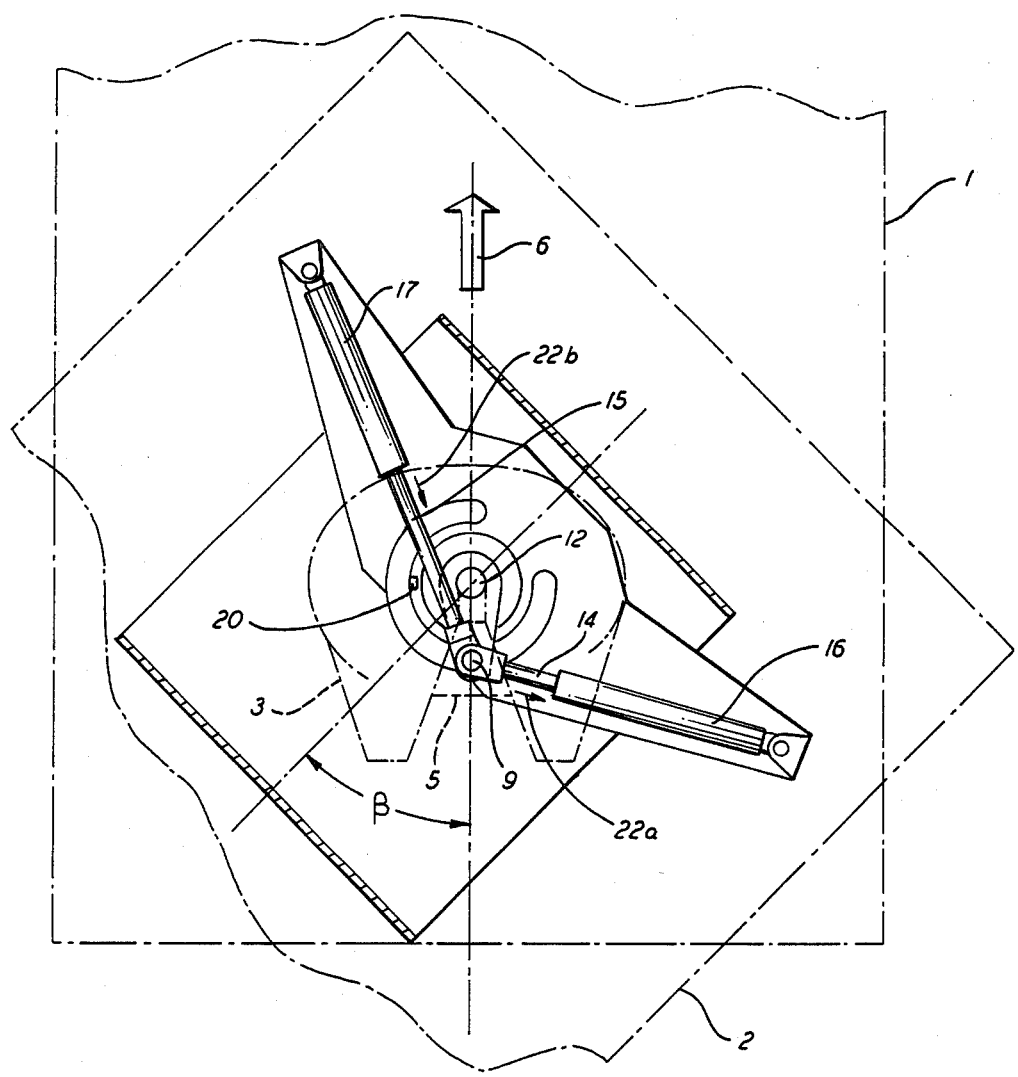
FIG. 4 is a partially schematic bottom view of a trailer provided with an anti-jackknifing apparatus pursuant to the present invention, showing the configuration of a portion of the apparatus in a relatively rotated state of a tractor and trailer.

FIG. 4 illustrates the semitrailer rig arrangement of FIG. 2 at a jackknifing angle $\beta = 45°$ of semitrailer 2 relative to tractor 1. While tractor 1 moves straight ahead as indicated by arrow 6, semitrailer 2 has been stopped in its jackknifing movement at angle $\beta$ in response to engagement of pin 9 with limit switch 21 (not visible in FIG. 4). Upon the onset of a jackknifing movement in a direction resulting in the configuration of FIG. 4, piston rod 14 moves into hydraulic cylinder 16 as indicated by an arrow 22a and piston rod 15 is extracted from hydraulic cylinder 17 as indicated by an arrow 22b. Rotation of semitrailer 2 takes place about king pin 4, and guide pin 9 with the piston rods 14 and 15 is entrained by wedge 5, which is fixed in fifth wheel 3.

Figure 5:
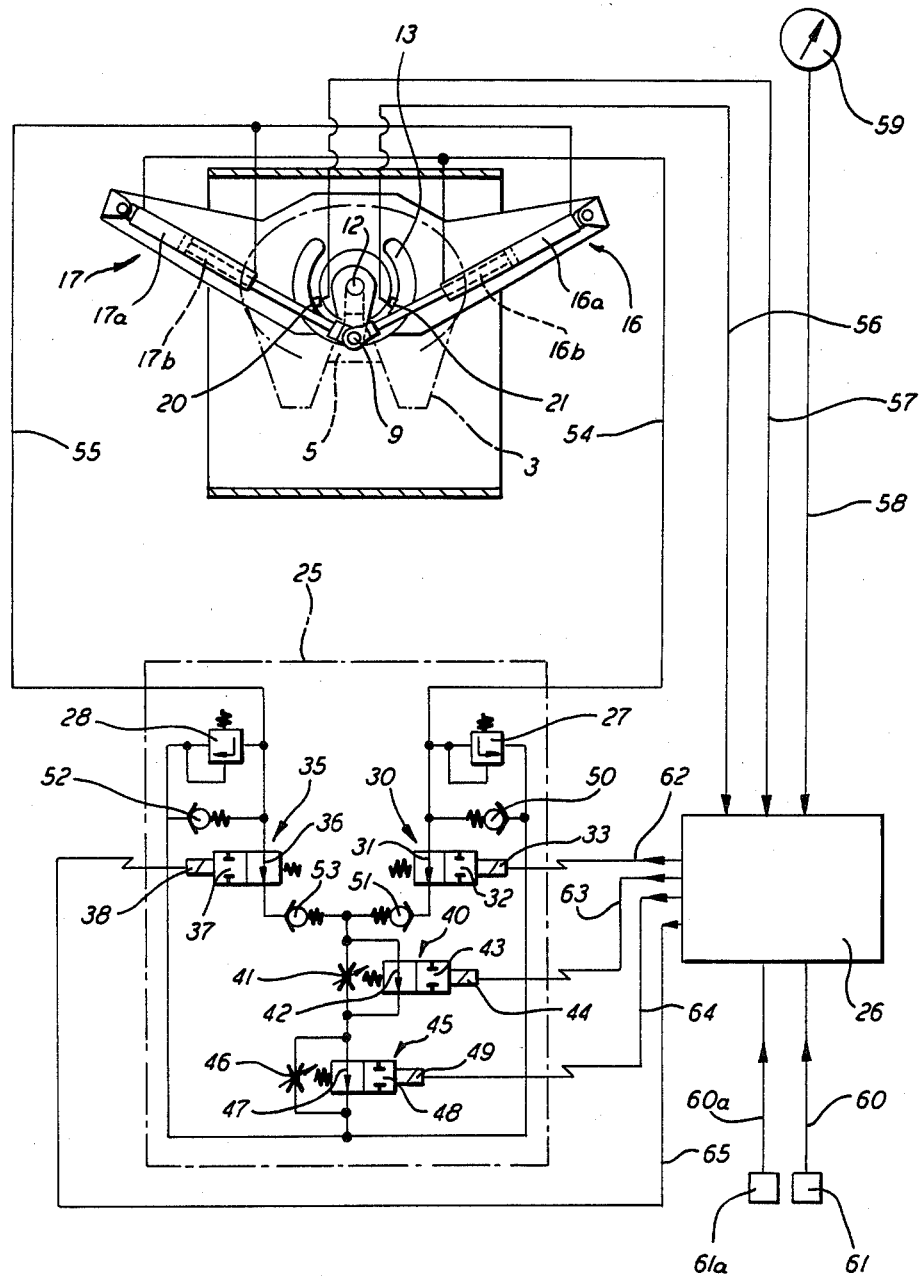
FIG. 5 is partially a bottom view similar to FIG. 2, partially a hydraulic circuit diagram and partially an electrical block diagram of an anti-jackknifing apparatus in accordance with the invention.

FIG. 5 shows an entire anti-jackknifing apparatus according to the present invention. In addition to the structural parts described above, semitrailer 2 is provided with a valve arrangement 25 and a control unit 26 electronically controlling the operation of the entire hydraulic system including a valve arrangement 25. The valve arrangement contains two pressure relief valves 27 and 28 for protecting against extreme pressure in the hydraulic system, two check valves 30 and 35, two throttle valves 40 and 45, and four non-return valves 50, 51, 52 and 53. Check valves 30 and 35 each have a free flow portion 31 and 36, a blocking portion 32 and 37, and a solenoid 33 and 38. Throttle valves 40 and 45 each have a throttling component 41 and 46, a free flow portion 42 and 47, and a blocking portion 43 and 48, fluid passing through the throttling component 41 or 46 upon movement of the respective blocking portion 43 or 48 to the active or connected position of the respective valve. In addition, each throttle valve has a solenoid 44 and 49.

Valve arrangement 25 communicates with double-action hydraulic cylinders 16 and 17 via hydraulic lines 54 and 55. Line 54 is connected to a chamber 16b of cylinder 16 located below the piston thereof and to a chamber 17a of cylinder 17 located above the respective piston. Similarly, line 55 is connected to cylinder chambers 17b and 16a. Extending to control unit 26 are a lead 56 from limit switch 21, a lead 57 from limit switch 20, and a lead 58 from a speedometer 59, as well as a lead 60 from a first pressure switch 61 and a lead 60a from a second pressure switch 61a, which switches are activated by brake pressure in tractor 1. From control unit 26, leads 62, 63, 64 and 65 extend to solenoids 33, 44, 49 and 38 of valves 30, 40, 45 and 35, respectively. In control unit 26, pulses from the incoming leads are transformed by programs into signals generated on the outgoing lines.

The entire hydraulic control system, including valve arrangement 25 and control unit 26, has the task of damping or braking the rotary movements of tractor 1 and semitrailer 2 relative to each other in certain states of travel by throttling hydraulic fluid flowing back and forth between hydraulic cylinders 16 and 17. The degree of throttling varies in accordance with vehicle speed as well as the brake pressure. Throttle valves 40 and 45 bring about attenuations of different intensity at throttle components 41 and 46. Thus, throttle component 41 may effectuate a light attenuation, throttle component 46 a medium attenuation, and both throttle components 41 and 46 a strong attenuation of the rotational movement between tractor 1 and semitrailer 2.

Example for Speed Control (a) Speed between 0 and 15 km/h: switches and valves.

At startup or during low speed maneuvering, the outputs of limit switches 20 and 21 are disconnected or disabled within control unit 26 and full freedom of the movement of guide pin 9 within the guideway or slot 13 is possible. There is no valve actuation, i.e., at jackknifing angles β up to approximately 135° hydraulic fluid flows unimpeded through pass portions 31 or 36 as well as 42 and 47 of the valves.

(b) Speed between 15 and 50 km/h: switches and valves.

In this speed range, outputs of limit switches 20 and 21 are connected or enabled within control unit 26 and solenoids 33 and 38 switch, in response to signals transmitted via leads 62 and 65, check valves 30 and 35, so that blocking portions 32 and 37 are connected to the hydraulic circuit as soon as jackknifing angle β reaches 45°, this angle being preset by limit switches 20 and 21 in accordance with their positions along guideway or slot 13. Further jackknifing beyond this jackknifing angle is thereby prevented, while turning back is always possible.

(c) Speed over 50 km/h: As under (b)

Additionally in this speed range, throttle valve 45 is switched via line 64 and solenoid 49 so that blocking portion 48 is connected to the hydraulic circuit and hydraulic fluid must accordingly flow through throttling component 46. The rotary movement between tractor 1 and semitrailer 2 accordingly undergoes medium damping in every permissible jackknifing angle β.

Example for brake pressure damping (a) Brake pressure less than 0.3 bar:

At pressures below 0.3 bar, there is full freedom of movement of pin 9 within slot 13 and no valve actuation.

(b) Brake pressure between 0.3 and 3.5 bars:

In this pressure range, there is a light attenuation of the relative rotary movement by actuation of valve 40 so that blocking portion 43 assumes the active position and fluid flows through throttling component 41. In response to signals from limit switches 20 and 21, control unit 26 limits the relative rotary movement of semitrailer 2 and tractor 1 to the maximum jackknifing angle β of 45°.

(c) Brake pressure between 3.5 and 5 bars:

Medium attenuation of the relative rotary movement between trailer 2 and tractor 1 is achieved by actuation of valve 45 so that blocking portion 48 is active and hydraulic fluid flows through throttling component 46. As in case b above, switches 20 and 21 cooperate with control unit 26 to limit rotation of trailer 2 relative to tractor 1.

(d) Brake pressure over 5 bars:

Maximum attenuation of the relative rotary movement between trailer 2 and tractor 1 is achieved by actuation of both valves 40 and 45 so that blocking portions 43 and 48 are connected to the hydraulic circuit, whereby hydraulic fluid flows through throttling components 41 and 46. As in cases (b) and (c), relative rotary movement of trailer 2 and tractor 1 is limited by control unit 26 in response to signals from limit switches 20 and 21.

What is claimed is:

1. An anti-jackknifing apparatus for a semitrailer rig including a trailer hitched to a tractor via a king pin and a wedge on said trailer and a fifth wheel on said tractor, said wedge being disposed behind said king pin, said king pin and said wedge being inserted into said fifth wheel, said apparatus comprising:

a coupling plate attached to said trailer, said coupling plate being provided with an arcuate guide slot extending along a portion of a circle having a center;

a guide pin attached to said wedge, said pin traversing said slot, said pin extending substantially perpendicularly with respect to said plate;

a pivot pin connected to said king pin and coaxial therewith, said pivot pin being disposed at said center of said slot;

means for attenuating rotary motion between said tractor and said trailer, said means for attenuating including two double-action hydraulic cylinders having respective piston rods, said piston rods having outer ends connected to said guide pin;

means for generating signals upon attainment of predetermined angles between said trailer and said tractor, said means for generating including a pair of limit switches attached to said coupling plate at points spaced from one another along said slot, said limit switches being operable by said guide pin during motion of said guide pin along said slot; and control means operatively connected to said means for attenuating and said limit switches for controlling pressurization of said cylinders to attenuate rotary motion between said tracter and said trailer as a function of both speed of travel of said semitrailer rig and brake pressure and for limiting a jackknifing angle between said trailer and said tractor in response to signals from said limit switches.

2. An anti-jackknifing apparatus as defined in claim 1, further comprising a lever connecting said guide pin to said pivot pin, said coupling plate being disposed above said wedge, additionally comprising a bracket mounted to said trailer, said cylinders being articulatedly attached to said bracket.

3. An anti-jackknifing apparatus as defined in claim 2, further comprising a speedometer and sensor means on said tractor for measuring brake pressure in brake cylinders of said tractor, said control means being operatively connected to said limit switches, said speedometer and said sensor means by respective electrical lines.

4. An anti-jackknifing apparatus as defined in claim 3 wherein said means for attenuating includes valve means operatively connected in a hydraulic circuit to said cylinders and electrically connected to said control means for permitting, in response to signals from said control means, free flow of a pressurization fluid between said cylinders for a first set of travel speed and brake pressure values and for reducing flow of said fluid between said cylinders for a second set of travel speed and brake pressure values.

5. An anti-jackknifing apparatus as defined in claim 4 wherein said control means includes means for preventing a fluid flow reduction at travel speeds below a predetermined threshold.

6. An anti-jackknifing apparatus as defined in claim 5 wherein said control means includes means for preventing a fluid flow reduction at brake pressures below a predetermined threshold.

7. An anti-jackknifing apparatus as defined in claim 4 wherein said valve means has two different attentuations within respective travel speed ranges and three different attentuations within respective brake pressure ranges.

8. An anti-jackknifing apparatus as defined in claim 7 wherein said valve means includes two pressure relief valves, four non-return valves, and two check valves each having a free flow portion, a blocking portion and a respective solenoid, said valve means further including two throttle valves each having a throttling component, a free flow portion, and a respective solenoid.

9. An anti-jackknifing apparatus as defined in claim 4 wherein said valve means includes two pressure relief valves, four non-return valves, and two check valves each having a free flow portion, a blocking portion and a respective solenoid, said valve means further including a proportional valve with a linear attenuation of the rotary motion between said tractor and said trailer proportional to travel speed, as indicated by said speedometer, and to brake pressure, as measured by said sensor means.

10. An anti-jackknifing apparatus as defined in claim 1, further comprising a speedometer and sensor means on said tractor for measuring brake pressure in brake cylinders of said tractor, said control means being operatively connected to said limit switches, said speedometer and said sensor means by respective electrical lines.

11. An anti-jackknifing apparatus as defined in claim 1 wherein said means for attenuating includes valve means operatively connected in a hydraulic circuit to said cylinders and electrically connected to said control means for permitting, in response to signals from said control means, free flow of a pressurization fluid between said cylinders for a first set of travel speed and brake pressure values and for reducing flow of said fluid between said cylinders for a second set of travel speed and brake pressure values.

12. An anti-jackknifing apparatus as defined in claim 11 wherein said control means includes means for preventing a fluid flow reduction at travel speeds below a predetermined threshold.

13. An anti-jackknifing apparatus as defined in claim 11 wherein said control means includes means for preventing a fluid flow reduction at brake pressures below a predetermined threshold.

14. An anti-jackknifing apparatus as defined in claim 11 wherein said valve means has two different attenuations within respective travel speed ranges and three different attenuations within respective brake pressure ranges.

15. An anti-jackknifing apparatus as defined in claim 11 wherein said valve means includes two pressure relief valves, four non-return valves, and two check valves each having a free flow portion, a blocking portion and a respective solenoid, said valve means further including two throttle valves each having a throttling component, a free flow portion, and a respective solenoid.

* * * * *

UNITED STATES PATENT AND TRADEMARK OFFICE
CERTIFICATE OF CORRECTION

PATENT NO. : 4,720,118

DATED : January 19, 1988

INVENTOR(S) : Rainer Schultz et al

It is certified that error appears in the above-identified patent and that said Letters Patent is hereby corrected as shown below:

In Column 1, line 35, change "US Pat. No. 4,015,856..." to read --US Pat. No. 4,015,859--

Signed and Sealed this

Sixth Day of September, 1988

*Attest:*

DONALD J. QUIGG

*Attesting Officer*  *Commissioner of Patents and Trademarks*